(12) United States Patent
Caddes et al.

(10) Patent No.: US 7,043,205 B1
(45) Date of Patent: May 9, 2006

(54) METHOD AND APPARATUS FOR OPENING A VIRTUAL SERIAL COMMUNICATIONS PORT FOR ESTABLISHING A WIRELESS CONNECTION IN A BLUETOOTH COMMUNICATIONS NETWORK

(75) Inventors: Scott Caddes, Sandy, UT (US); Elwin G. Hunt, Sandy, UT (US); Ned Plasson, Park City, UT (US); William Raines, Sandy, UT (US); Randy C. Smith, Kaysville, UT (US); Ronald D. Smith, American Fork, UT (US)

(73) Assignee: 3Com Corporation, Marlborough, MA (US)

( * ) Notice: Subject to any disclaimer, the term of this patent is extended or adjusted under 35 U.S.C. 154(b) by 914 days.

(21) Appl. No.: 09/953,700

(22) Filed: Sep. 11, 2001

(51) Int. Cl.
*H04B 7/00* (2006.01)

(52) U.S. Cl. .................. 455/41.2; 455/557; 455/41.3; 455/61; 455/517; 455/426.1; 455/556.2; 455/3.05

(58) Field of Classification Search ............... 455/3.01, 455/3.05, 41.2, 41.3, 550.1, 557, 61, 556.2, 455/517, 426.1
See application file for complete search history.

(56) References Cited

U.S. PATENT DOCUMENTS

| 5,790,895 | A | | 8/1998 | Krontz et al. ............... 395/884 |
| 5,812,820 | A | * | 9/1998 | Loram ......................... 703/20 |
| 5,867,666 | A | * | 2/1999 | Harvey ....................... 709/239 |
| 6,230,118 | B1 | * | 5/2001 | Bader et al. ................. 703/24 |
| 6,330,599 | B1 | * | 12/2001 | Harvey ....................... 709/223 |
| 6,381,467 | B1 | * | 4/2002 | Hill et al. .................... 455/519 |
| 6,571,103 | B1 | * | 5/2003 | Novakov ..................... 455/464 |
| 6,600,902 | B1 | * | 7/2003 | Bell ......................... 455/41.2 |
| 6,633,757 | B1 | * | 10/2003 | Hermann et al. ........ 455/414.1 |
| 6,760,804 | B1 | * | 7/2004 | Hunt et al. ................. 710/313 |
| 6,826,387 | B1 | * | 11/2004 | Kammer .................... 455/41.2 |

* cited by examiner

*Primary Examiner*—Ovidio Escalante
*Assistant Examiner*—Samir Karovalia

(57) ABSTRACT

A method and apparatus for opening a communications port for communication over a wireless communication network. Specifically, one embodiment of the present invention discloses a method for opening a virtual communications (VCOM) port that is configured with a particular profile over a Bluetooth network. After an attempt to open the VCOM port is received from a first application at a first electronic device, the process is suspended until a communication path is established over the Bluetooth communication network between the first electronic device and a remote electronic device within a Bluetooth network. The remote electronic device may be selected by a user from a list of available devices. In another embodiment, a user may pre-configure the VCOM port for a specific functional profile and pre-configure a remote electronic device to the VCOM port.

25 Claims, 9 Drawing Sheets

METHOD AND APPARATUS FOR OPENING A VIRTUAL SERIAL COMMUNICATIONS PORT FOR ESTABLISHING A WIRELESS CONNECTION IN A BLUETOOTH COMMUNICATIONS NETWORK

BACKGROUND OF THE INVENTION

1. Field of the Invention

The present invention relates to the field of wireless communications. More specifically, the present invention relates to opening a virtual serial communications port with a legacy application over a wireless communication network. Moreover, the present invention relates to a user interface for selecting a remote electronic device in a wireless communication network for communication purposes.

2. Related Art

Wireless communication technologies allow for the replacement of the many proprietary cables that connect one physical device to another physical device with a wireless communication link. For example, printers, personal digital assistants (PDAs) or handheld computers, personal desktop computers, fax machines, keyboards, joysticks and virtually any other digital device can be coupled together as part of a wireless communication network.

The wireless communication network provides a universal bridge to data networks, a peripheral interface, and a mechanism to form small private ad-hoc groupings of connected devices away from fixed network infrastructures. In other words, instead of transferring data over physical cable connections, data is transferred over the wireless communication network.

Serial communication ports in different electronic devices previously were connected using wired serial connections. The serial communication port in a local device was associated with a remotely located hardware device that could perform a single function or multiple functions. In other words, a piece of hardware that promoted serial communication would be associated with or configured to a single communication port. As such, there would be a one-to-one relationship between a remotely located hardware device and the serial communication port located on a local device.

However, in a wireless communication network, a serial port on a local electronic device could be associated with any one of numerous remote electronic devices. All of these devices are part of a local wireless network. Since the devices can roam, devices that are associated with a local network at one moment may not be associated with the same local network at another moment. The devices may roam between different local wireless networks, or the devices may simply roam out the range of the local network.

The constant roaming of devices can create a flexible network environment. However, legacy applications that are not compatible with a wireless communication standard are configured to serial communication ports that no longer have a one-to-one relationship with a constant remote electronic device, as in a printer, or with an unknown remote electronic device that has a particular functionality, such as a remote device with facsimile functionality. As such, since the legacy application assumes incorrectly that only one remote device is available for communication, communication between a legacy application with a particular functionality and a second application on a remote device with the same functionality many times will fail or simply cannot occur. The failure occurs because the legacy application is unaware of multiple devices, and incapable of selecting a device to which a communication port is connected.

In the case where multiple remote electronic devices exist in a local network, each of which are capable of supporting the particular functionality of the application on a local device, the legacy application is incapable of selecting between the numerous remote devices. In the case where only a single remote electronic device is available over a local network, establishing a wireless connection between the remote device and the local device may take too long. The serial communication port may be opened and data from the application may be sent to the serial communication port before a wireless communication path is established between the local device and the remote device. In this case, the transfer of data will again fail.

Thus, a need exists for a method and apparatus for legacy application communication over a wireless communication network containing numerous remote devices. Another need exists for legacy application integration with a wireless communication network for establishing a connection to a particular remote device.

SUMMARY OF THE INVENTION

The present invention provides a method and apparatus for opening a virtual serial communications port by a legacy application over a wireless communication network. The present invention achieves the above accomplishment and also provides for legacy application communication over a wireless communication network containing numerous remote devices. The present invention achieves the above accomplishments and also provides for legacy application integration with a wireless communication network for establishing a connection to a particular remote device.

Specifically, one embodiment of the present invention discloses a method for opening a virtual serial communications (VCOM) port that is configured with a particular profile, offering a specific feature or features, over a wireless communication network. The profile may be a facsimile profile, dial-up networking profile, serial port profile for a general client, serial port profile for a host, etc.

After an attempt to open the VCOM port is received from a legacy application at a first electronic device, the opening of the port is suspended until a data communication path is established over the wireless communication network between the first electronic device and a remote electronic device within a wireless network. The legacy application in many cases is not compatible with a protocol associated with the wireless communication network. The remote electronic device may be selected by a user from a list of available devices, each of which is capable of supporting the particular profile. In another embodiment, a user may pre-configure the VCOM port for a specific functional profile and pre-configure a remote electronic device to the VCOM port.

A connection manager application specific to the wireless communication network coordinates a user's interactions between other remote devices on the wireless communication network. The basic function of the connection manager application is to perform device discovery and determine the services, or functional profiles supported on each of the discovered devices. Further, the connection manager enables the user to make service oriented connections to other remote devices that are coupled to the wireless communication network.

In one embodiment of the present invention, a connection manager application is implemented as an integrated hardware device and serial filter driver configuration on a wirelessly enabled electronic device. The connection manager application creates and manages a plurality of virtual communication (VCOM) serial ports. To the end user, the virtual port is presented to legacy applications and its host operating system. The virtual port acts and behaves like a serial communication port in the host computer system having a wired connection to a remote device.

In opening a serial VCOM port for communication purposes, a communication path to a particular remote device must be established. A method for opening a serial VCOM port at a local electronic device is disclosed in one embodiment of the present invention that establishes a communication path to a remote device before a legacy application begins transmitting data. When a call to open a serial VCOM port is received at a driver of the VCOM port, the driver notifies the protocol stack of the attempt to open. The protocol stack coordinates communication over the wireless communication network. In one embodiment of the present invention, the protocol stack and the wireless communication network substantially comply with a version of the Bluetooth communication standard.

The connection manager application creates and manages the driver of the serial VCOM port, and communicates with the protocol stack as described above. In one embodiment of the present invention, a list of available devices in the local wireless network will be presented to a user for selection. After a selection is made, the protocol stack initiates and establishes a data communication path between the local electronic device and the selected remote electronic device.

A success message is sent to the VCOM port driver after the communication path is established by the protocol stack. The driver then opens the port for use by the legacy application. The driver then returns a successful message to the legacy application in response to the call to open the VCOM port. Thereafter, data can be exchanged between the legacy application located on the local electronic device and the remote electronic device over the wireless communication network.

In another embodiment of the present invention, the list of available devices may be refreshed to reflect the current state of the local wireless network. When a call to open a serial VCOM port is made, the list of available devices is only as current as when the last scan or inquiry for devices in the network was performed. Depending on user preferences, the time elapsed from the last scan or inquiry may be one minute or fifteen minutes. The longer the elapsed time, the more probability that remote devices may have roamed into or out of the local wireless network associated with the local electronic device. Thus, the list of available devices may not accurately depict the actual list of available devices.

As such, the user is presented with an option for refreshing the list of available devices before the serial VCOM port is opened. If the user elects to refresh the list of available devices, the protocol stack will inquire or scan for the current devices that provide the same service as requested by the legacy application within the local network associated with the local electronic device. This updated list of available devices is then presented to the user for selection.

In another embodiment of the present invention, the serial VCOM port may be pre-configured by a user for a specific service or functional profile. Additionally, the serial VCOM port may be pre-configured by a user to a specific remote device. In both cases, the connection manager application coordinates configuration of the serial VCOM port before a connection is established and prior to any call by a legacy application to open the serial VCOM port.

These and other objects and advantages of the present invention will no doubt become obvious to those of ordinary skill in the art after having read the following detailed description of the preferred embodiments which are illustrated in the various drawing figures.

DETAILED DESCRIPTION OF THE INVENTION

Figure 1:
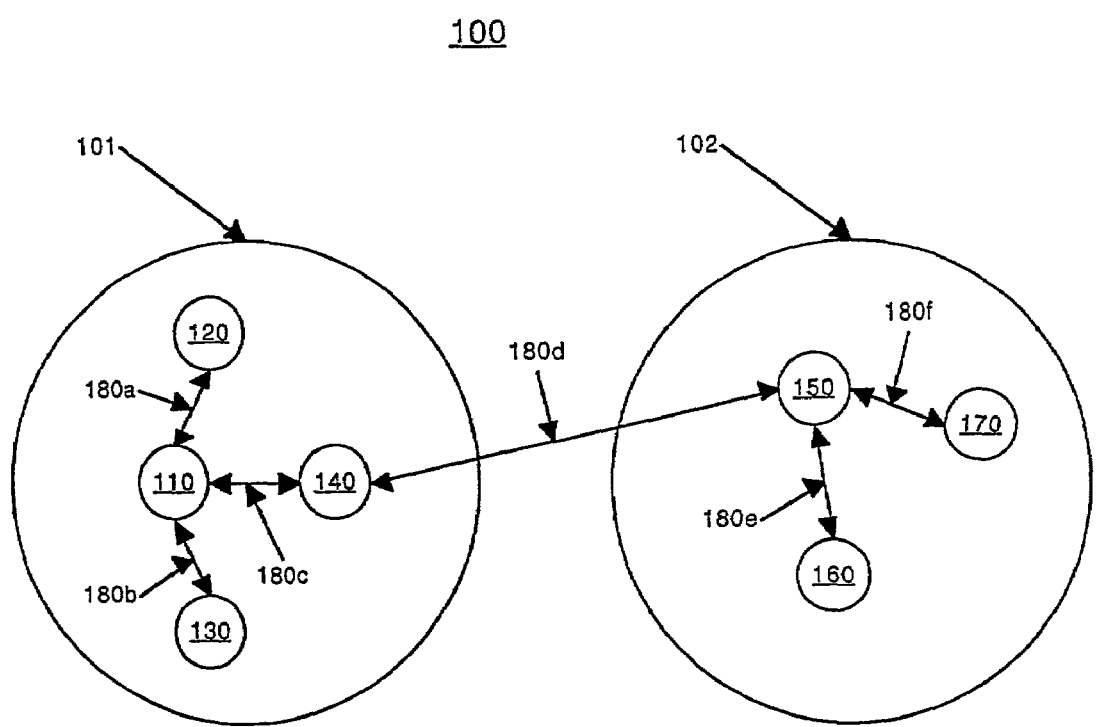
FIG. 1 illustrates a network of devices coupled using wireless connections, in accordance with one embodiment of the present invention.

Reference will now be made in detail to the preferred embodiments of the present invention, an apparatus and method for opening a virtual serial communications port in a wireless communication network, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," or "processing," or "computing," or "translating," or "calculating," or "determining," or "scrolling," or "displaying," or "recognizing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Apparatus and Method for Opening a Serial Virtual Communications Port in a Bluetooth Wireless Communication Network Some embodiments of the present invention are discussed primarily in a context in which devices and systems are coupled using wireless links, and specifically with regard to devices and systems compliant with the Bluetooth technology. Bluetooth is the code name for a technology specification for small form factor, low-cost, short-range radio links between personal computers (PCs), mobile phones and other devices. The Bluetooth technology allows cables that connect devices to one another to be replaced with short-range radio links. However, it is appreciated that the present invention may be utilized with devices and systems coupled using technologies and/or protocols different from Bluetooth, including but not limited to infrared communications links as defined by the Infrared Data Association (IrDA).

While embodiments of the present invention are described in a Bluetooth environment, it is appreciated that other embodiments of the present invention are well suited to protocols associated with other wireless communication standards, such as the IEEE 802.11 wireless communication standard.

In the parlance of Bluetooth, a collection of devices connected in a Bluetooth system is referred to as a "piconet." A piconet starts with two connected devices, such as a computer system and a cellular phone, and may grow to eight connected devices. All Bluetooth devices are peer units; however, when establishing a piconet, one unit will act as a master and the other(s) as slave(s) for the duration of the piconet connection.

A Bluetooth system supports both point-to-point and point-to-multi-point connections. Several piconets can be established and linked together in a "scatternet," where each piconet is identified by a different frequency hopping sequence. All devices participating on the same piconet are synchronized to their respective hopping sequence.

FIG. 1 illustrates the topology of a network 100 of devices coupled using wireless connections in accordance with one embodiment of the present invention. Devices 110, 120, 130 and 140 are coupled in piconet 101 using wireless connections 180*a–c*. Similarly, devices 150, 160 and 170 are coupled in piconet 102 using wireless connections 180*e* and 180*f*. Piconet 101 and piconet 102 are coupled using wireless connection 180*d*. Devices 110–170 can be printers, personal digital assistants (PDAs), desktop computer systems, laptop computer systems, cell phones, fax machines, keyboards, joysticks and virtually any other electronic device. In the present embodiment, devices 110–170 are Bluetooth devices; that is, they are equipped with a Bluetooth radio transceiver, or they are adapted to communicate with Bluetooth devices ("Bluetooth-enabled"). That is, the Bluetooth radio transceiver may be integrated into a device, or it may be coupled to a device.

Figure 2:
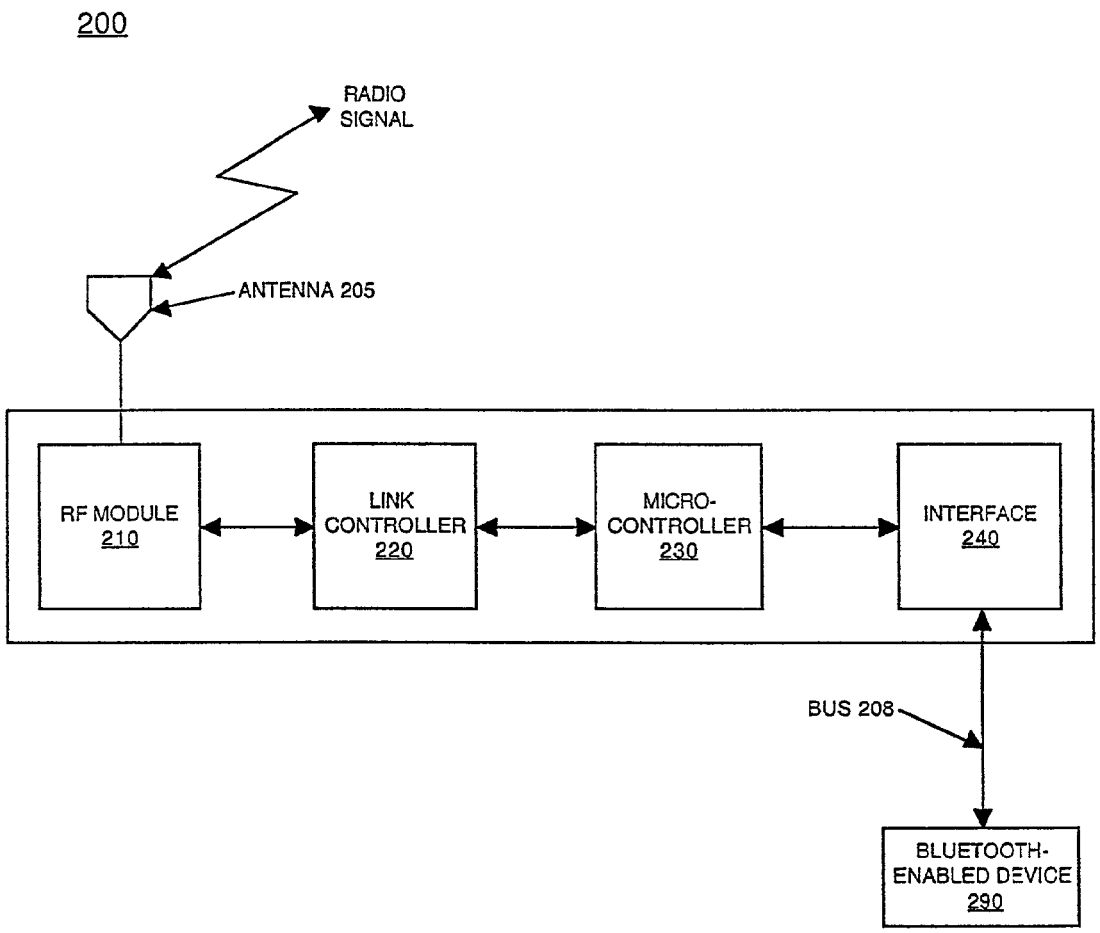
FIG. 2 illustrates a block diagram showing one embodiment of a Bluetooth wireless transceiver, in accordance with one embodiment of the present invention.

FIG. 2 is a block diagram of one embodiment of a transceiver 200 in accordance with the present invention. In a preferred embodiment (the "Bluetooth embodiment"), transceiver 200 is a Bluetooth device comprising a digital component (e.g., a Bluetooth controller) and an analog component (e.g., a Bluetooth radio).

In the present embodiment, transceiver 200 comprises an antenna 205 for receiving or transmitting radio signals, a radio frequency (RF) module 210, a link controller 220, a microcontroller (or central processing unit) 230, and an external interface 240. In the present embodiment, transceiver 200 is coupled by a system bus 208 to a Bluetooth-enabled device 290 (e.g., a host device such as a computer system or similar intelligent electronic device, a wireless digital picture device, a digital imaging device, a digital camera, a PDA, a printer, a fax machine, etc.). However, it is appreciated that in another embodiment, transceiver 200 may be integrated into Bluetooth-enabled device 290.

In the Bluetooth embodiment, RF module 210 is a Bluetooth radio. The Bluetooth radio can provide: a bridge to existing data networks, a peripheral interface, and a mechanism to form piconets of connected devices away from fixed network infrastructures (see FIG. 2).

Bluetooth radios operate in the ISM (Industrial, Scientific, Medical) band at 2.4 GHz. A frequency hop transceiver is applied to combat interference and fading. Bluetooth uses a packet-switching protocol based on a frequency hop scheme with 1600 hops/second. Slots can be reserved for synchronous packets. A packet nominally covers a single slot, but can be extended to cover up to five slots. Each packet is transmitted in a different hop frequency. The entire available frequency spectrum is used with 79 hops of one (1) MHz bandwidth, defined analogous to the IEEE (Institute of Electronic and Electrical Engineering) 802.11 standard. The frequency hopping scheme is combined with fast ARQ (Automatic Repeat Request), cyclic redundancy check (CRC) and Forward Error Correction (FEC) for data.

In the present embodiment, link controller 220 is a hardware digital signal processor for performing baseband processing as well as other functions such as Quality-of-Service, asynchronous transfers, synchronous transfers, audio coding, and encryption. Link controller 220 has two major states: standby and connection. In addition, there are seven substates: page, page scan, inquiry, inquiry scan, master response, slave response, and inquiry response. The substates are interim states that are used to add new slaves to a piconet (see FIG. 1).

Continuing with reference to FIG. 2, in one embodiment, microcontroller 230 is an application specific integrated circuit (ASIC). In the Bluetooth embodiment, microcontroller 230 is a separate central processing unit (CPU) core for managing transceiver 200 and for handling some inquiries and requests without having to involve the host device. In the Bluetooth embodiment, microcontroller 230 runs software that discovers and communicates with other Bluetooth devices via the Link Manager Protocol (LMP). The LMP provides a number of services including sending and receiving of data, inquiring of and reporting a name or device identifier, making and responding to link address inquiries, connection setup, authentication, and link mode negotiation and setup. The LMP also can be used to place transceiver 200 in "sniff" mode, "hold" mode, "park" mode or "standby" mode.

The hold mode is a power saving mode that can be used for connected units if no data need to be transmitted. The sniff and park modes are also low power modes. In the sniff mode, a device listens to the piconet at a reduced rate (relative to the regular rate), thus reducing its duty cycle. The sniff interval is programmable and depends on the application. In the park mode, a device is still synchronized to the piconet but does not participate in the traffic.

In the present embodiment, before any connections between Bluetooth devices are created, all devices are in standby mode; that is, the standby mode is the default mode of a Bluetooth device. The standby mode is a low power mode in which an unconnected unit "listens" for messages at a regular rate (generally, every 2.56 seconds according to the Bluetooth specification) on a set of hop frequencies defined for that unit. Link controller 220 may leave the standby mode to scan for page or inquiry messages, or to transmit a page or inquiry message. When responding to a page message, the Bluetooth device enters the connection state as a slave. When carrying out a successful page attempt, the Bluetooth device enters the connection state as a master.

A "discoverable device" is a Bluetooth device in range that will respond to an inquiry (normally in addition to responding to a page). A "connectable device" is a Bluetooth device in range that will respond to a page.

With reference still to FIG. 2, in the present embodiment, interface 240 is for coupling transceiver 200 to Bluetooth-enabled device 290 in a suitable format. Transceiver 200 may be coupled by system bus 208 to Bluetooth-enabled device 290 (e.g., a host device such as a computer system or similar intelligent electronic device, a PDA, a printer, a fax machine, etc.), or transceiver 200 may be integrated into Bluetooth-enabled device 290. In the present embodiment, interface 240 runs software that allows transceiver 200 to interface with the operating system of Bluetooth-enabled device 290. In accordance with the present invention, interface 240 may be any of a variety of physical bus interfaces, including but not limited to a Universal Serial Bus (USB) interface, a Personal Computer (PC) Card interface, a CardBus, Peripheral Component Interconnect (PCI) local bus, a mini-PCI interface, a Personal Computer Memory Card International Association (PCMCIA) interface, an Industry Standard Architecture (ISA) interface, or a RS-232 interface.

Figure 3:
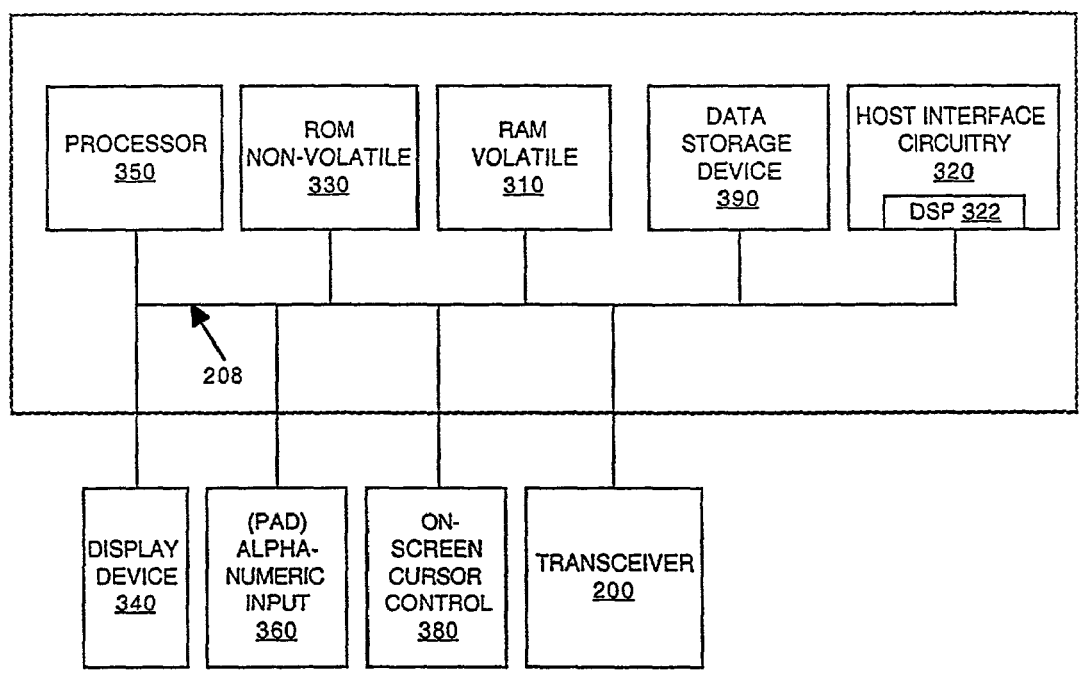
FIG. 3 is a block diagram of an exemplary electronic device coupled to the Bluetooth wireless transceiver of FIG. 2, in accordance with one embodiment of the present invention.

Apparatus and Method for Opening a Virtual Serial Communications Port for Communication in a Wireless Communication Network With reference now to FIG. 3, portions of the opening of a virtual communications (VCOM) serial port for communication over a wireless communication network method and apparatus are comprised of computer-readable and computer executable instructions which reside, for example, in computer-usable media of a computer system. FIG. 3 illustrates an exemplary electronic device 300 with wireless capabilities used to perform the opening of a VCOM serial port, in accordance with embodiments of the present invention. It is appreciated that device 300 of FIG. 3 is exemplary only and that the present invention can operate within a number of different intelligent electronic devices, such as a desktop computer system, a laptop computer system, a personal digital assistant (PDA), etc. In the Bluetooth embodiment, electronic device 300 is a Bluetooth enabled device coupled with a Bluetooth transceiver, such as transceiver 200.

Continuing with reference to FIG. 3, electronic device 300 can include a computer controlled software application for creating and managing a virtual serial communications port, coordinating the opening of the virtual serial communication port, discovering connectable devices within the piconet or local network, and coordinating the connections to remote devices in the piconet. In general, electronic device 300 includes an address/data bus 208 for communicating information, a central processor 350 coupled with the bus 208 for processing information and instructions, a volatile memory 310 (e.g., random access memory (RAM), static RAM, dynamic RAM, etc.) coupled with the bus 208 for storing information and instructions for the central processor 350, and a non-volatile memory 330 (e.g., read only memory (ROM), programmable ROM, flash memory, EPROM, EEPROM, etc.) coupled with the bus 208 for storing static information and instructions for the processor 350. The electronic device 300 also includes a data storage device 390 (e.g., a compact memory device such as a smart stick, flash memory, or a memory stick) coupled with the bus 208 for storing information and instructions. Data storage device 390 can be removable.

The electronic device 300 also contains a viewing screen 340 coupled to the bus 208 for displaying digital images to the user. The viewing screen 340 utilized with electronic device 300 may be a liquid crystal display (LCD) device, a cathode ray tube (CRT), a field emission display device (also called a flat panel CRT), or other display device suitable for generating graphic images and alphanumeric characters recognizable to the user.

The electronic device 300 also includes a signal transmitter/receiver (transceiver) device 200, which is coupled to bus 208 for providing a wireless radio (RF) communication link between electronic device 300 and other wireless devices. In the Bluetooth embodiment, transceiver 200 is compliant with the Bluetooth specification (see FIG. 2).

It is appreciated that transceiver 200 is well-suited to be implemented in a wide variety of ways. For example, transceiver 200, in another embodiment, can be an Input/Output (I/O) interface (not shown) for providing a communication link between device 300 and a network environment. The (I/O) interface allows electronic device 300 to transmit and receive digital content with other electronic devices in a wireless or wired environment. In still another embodiment, the I/O interface could be implemented as a modem. Further, the I/O interface could support an IR port, serial port, USB port, PC-Card, etc.

In one embodiment, electronic system 300 of FIG. 3 includes host interface circuitry 320 coupled to bus 208 in a Bluetooth communication environment. Host interface circuitry 320 includes an optional digital signal processor (DSP) 322 for processing data to be transmitted or data that are received via transceiver 200. Alternately, processor 350 can perform some or all the functions performed by DSP 322.

Also included in electronic device 300 is an optional alphanumeric input device 360, in another embodiment of the present invention. Alphanumeric input device 360 can communicate information and command selections to processor 350 via bus 208. In one implementation, alphanumeric input device 360 is a touch screen device. Alphanumeric input device 360 is capable of registering a position where contact is made.

In still another embodiment of the present invention, electronic device 300 also includes an optional cursor control or directing device (on-screen cursor control 380) coupled to bus 208 for communicating user input information and command selections to processor 350. In one implementation, on-screen cursor control device 380 is a touch screen device incorporated with viewing screen 340. On-screen cursor control device 380 is capable of registering a position on viewing screen 340 where a stylus element (not shown) makes contact.

Figure 4:
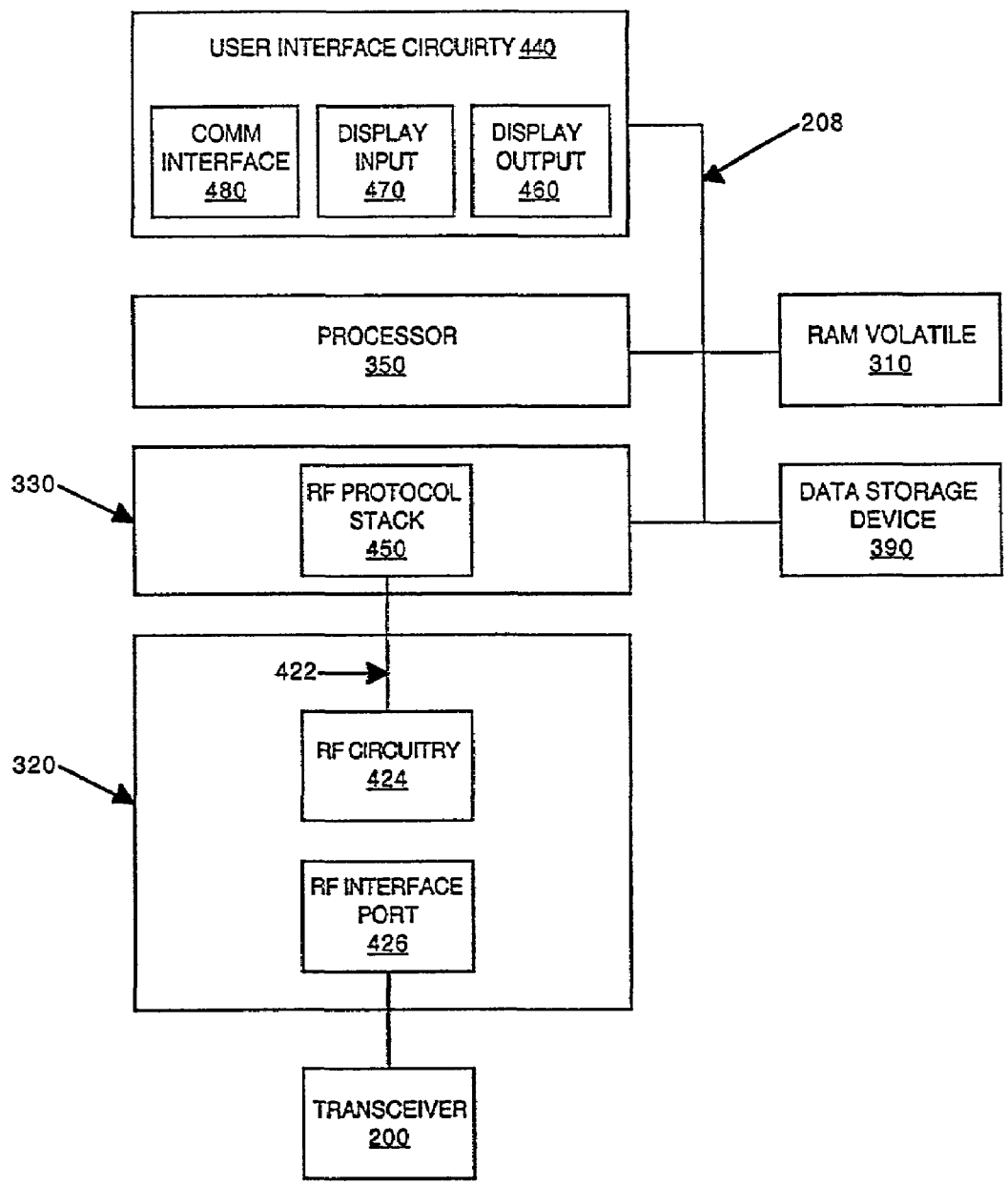
FIG. 4 is a block diagram showing features of an exemplary electronic device of FIG. 3, in accordance with one embodiment of the present invention.

FIG. 4 is a block diagram showing additional features of electronic device 300 in accordance with one embodiment of the present invention. User interface circuitry 440 is coupled to processor 350 via bus 208. User interface circuitry includes hardware and software components that provide user input and output resources for functions performed by processor 350. In the present embodiment, user interface circuitry 440 includes a display output 460, a display input 470, and communication interface 480.

In this embodiment, display output 460 receives digital information representing graphical information from processor 350, and converts the information to a graphical display, such as text and/or images, for display on viewing screen 340 (FIG. 3), for example. Display input 470 may receive data inputs, such as graphical data inputs, from a user. The graphical data inputs can be entered by the user with a stylus element (not shown) on the viewing screen 340 that is optionally pressure-sensitive (specifically, on-screen cursor control device 380, FIG. 3) or the alphanumeric input device 360 (FIG. 3).

In one embodiment of the present invention, the communication interface 480 is a serial communication port, but could also alternatively be of any of a number of well-known communication standards and protocols, e.g., parallel, SCSI (small computer system interface), Firewire (IEEE 1394), Ethernet, Universal Serial Bus (USB), Personal Computer Memory Card International Association (PCMCIA), etc.

Host interface circuitry 320 is coupled to processor 350 via bus 208. In the Bluetooth embodiment, host interface circuitry 320 (or link interface circuitry or data interface circuitry) illustrates, but is not limited to, an RF interface port 426 for establishing a wireless link to another device.

In the present embodiment, RF circuitry 424 converts signals to radio frequency output and accepts radio frequency input via RF interface port 426. In the Bluetooth embodiment, RF interface port 426 is a Bluetooth transceiver 200 (FIG. 2). RF signals received by RF circuitry 424 are converted to electrical signals and relayed to RF protocol stack 450 via connection 422. Processor 350 is capable of executing RF protocol stack 450.

In order to use an application over a wireless communication network (e.g., Bluetooth network), a virtual communication (VCOM) port to a device or assigned with a particular service or functionality must exist. Embodiments of the present invention disclose an electronic device (e.g., device 300) that includes a VCOM serial port. For example, communication interface 480 of FIG. 4 could be a VCOM serial port. The VCOM serial port is presented to the user and legacy serial applications at the user level as a fully recognized and initialized serial port typical of a wired connection to a remote device. However, instead of being connected to a dedicated remote device, the VCOM serial port is of a selected Bluetooth functional profile and may or may not necessarily be coupled with a remote electronic device with that particular profile at any particular time.

The Bluetooth profiles include but are not limited to profiles such as a serial host communication port, a serial client communication port, a facsimile (FAX) client communication port, a DUN client communication port, local area network (LAN) access point (LAP) client communication port, and a Transmission Control Protocol/Internet Protocol interface.

In one embodiment of the present invention, a plurality of VCOM serial ports are created and managed by a connection manager application. Each of the VCOM ports has an associated driver. In addition, for purposes of opening a VCOM port, the connection manager coordinates communication between the wireless communication protocol stack (e.g., the Bluetooth protocol stack) and the VCOM port in order to facilitate communication over the wireless communication network.

The VCOM serial port is not associated particularly to a specific hardware device. This is because in a wireless communication network, multiple devices with multiple functionalities or profiles enter and leave the local area network (LAN), or piconet in a Bluetooth environment, associated with the electronic device 300. Instead, each initialized serial port is flexibly configured to support a particular profile. This allows a user of electronic device 500 to select between multiple devices that are currently within its local wireless network, or piconet in a Bluetooth environment.

A connection manager application helps coordinate the opening of a VCOM serial port by a legacy application for purposes of transferring data over a communication path. By definition, the legacy application is not compatible with the protocol associated with the wireless communication network. However, a connection manager application is able to coordinate the opening of a VCOM serial port and establish a communication path over the wireless network for purposes of transferring data.

For example, some legacy applications that communicate serially over a serial communication port will not work if their attempt to open a VCOM serial port succeeds before a Bluetooth wireless connection is established. In particular, the DUN application on a local electronic device attempts to open a communication port. As soon as the open port succeeds with a successful return back to the legacy DUN application, the DUN application begins to send modem commands out through the VCOM port. The DUN application expects to receive responses within two seconds. However, the protocol associated with the wireless communication network may take longer than two seconds to establish a connection with a remote device. As such, the DUN application will terminate any future modem commands because it senses a failure in the communication path to the remote device. However, the present embodiment suspends the opening of a VCOM port until a communication path is established over the Bluetooth communication network between the first electronic device and a remote electronic device within a Bluetooth network. This allows legacy application compatibility in opening a VCOM port in a wireless communication network.

Figure 5:
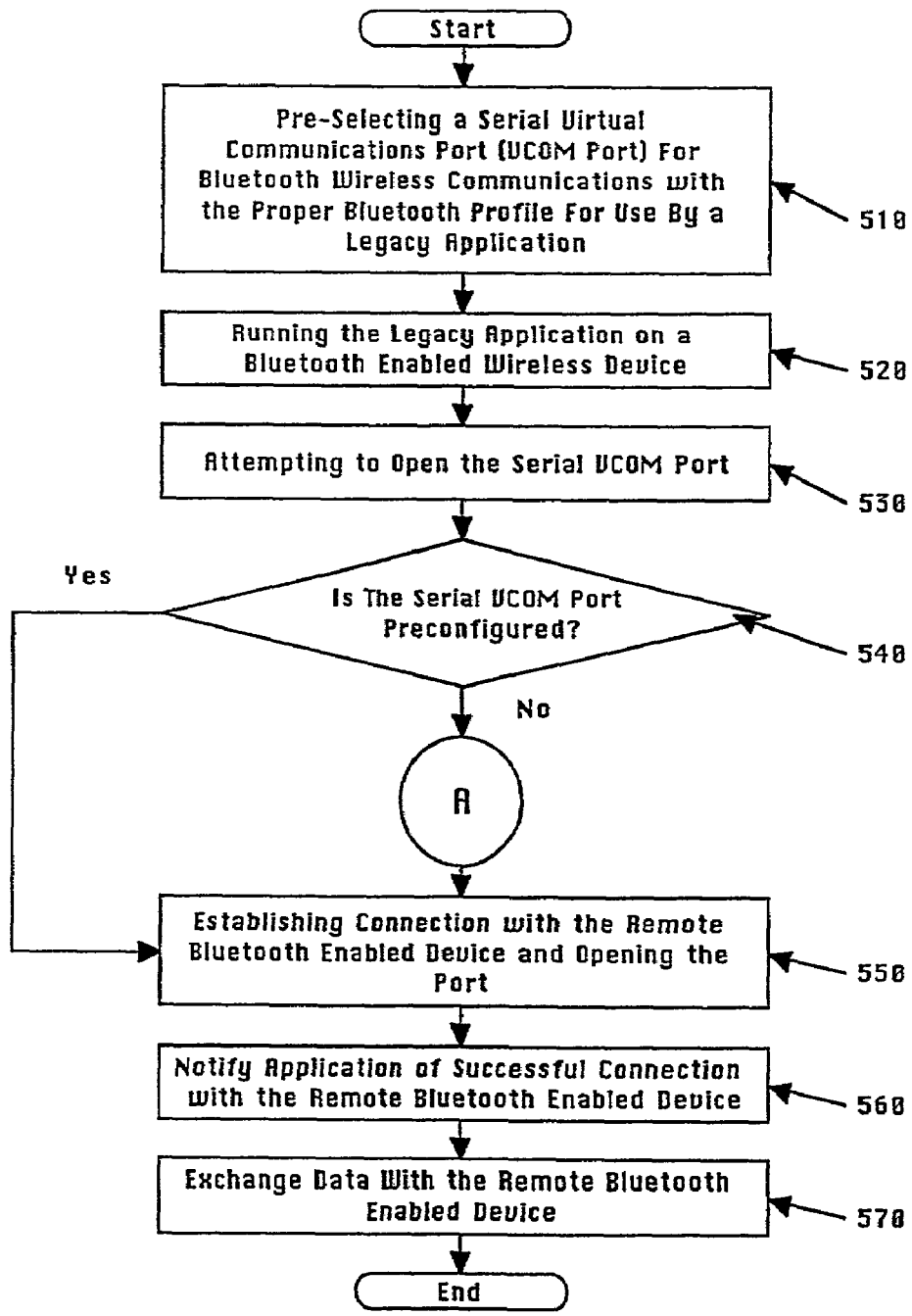
FIG. 5 is a flow diagram illustrating steps in a computer implemented method for opening a virtual serial communications port, in accordance with one embodiment of the present invention.

FIG. 5 is a flow chart 500 illustrating steps in a computer implemented method for opening a VCOM serial port that is generalized, in accordance with one embodiment of the present invention. In step 510, the present embodiment begins by assigning a VCOM serial port to a legacy application for communication with remote electronic devices. This is typically performed upon loading the legacy application onto the electronic device 300 that is enabled with wireless capabilities.

The VCOM port is associated with a particular functional profile or service. In one embodiment, the VCOMM serial ports are created automatically during installation of the connection manager application. Some VCOM profiles supported by the connection manager application include the DUN profile, FAX profile, generic serial and serial host profiles. The legacy application communicates over a VCOM port that is configured to the same functional profile or service that is provided by the legacy application. As such, the legacy application is assigned a VCOM port that is of the associated functional profile. For example, if the legacy application is a FAX application, then an assigned VCOM port would have a FAX functional profile.

In step 520, the present embodiment launches the legacy application. In order for the legacy application to communicate with a second application located on remote device, the assigned VCOM port must be opened. In step 530, the present embodiment attempts to open the VCOM port.

The present embodiment decides if the VCOM port has been pre-configured in step 540 of flow chart 500. If the VCOM port has not been configured, then the present embodiment proceeds to step A to prompt the user to select from a list of available devices within the piconet or local wireless network. Step A is illustrated further in flow chart 7 of FIG. 7. After a remote device is selected, the present embodiment proceeds to step 550 where a communication path is established between the local electronic device containing the legacy application and the selected remote electronic device.

On the other hand, if the VCOM port has been pre-configured, then the present embodiment proceeds directly to step 550. In one embodiment, the VCOM port can be configured, before a call to open a port is sent, to connect to a specific remote device. Additionally, the VCOM port can be reconfigured or edited to change its particular functional profile or service. In step 550, the remote device has either been selected or pre-configured. As such, a communication path is established with the remote device that is selected or pre-configured. The remote electronic device contains a second application that provides the same service as the legacy application such that the two applications can communicate over the communication path.

In step 560 of flow chart 500, the present embodiment notifies the legacy application that the port is open for communication. In step 570, the present embodiment allows for the exchange of data between the local electronic device and the remote electronic device over the established communication path over the wireless communication network.

Figure 6:
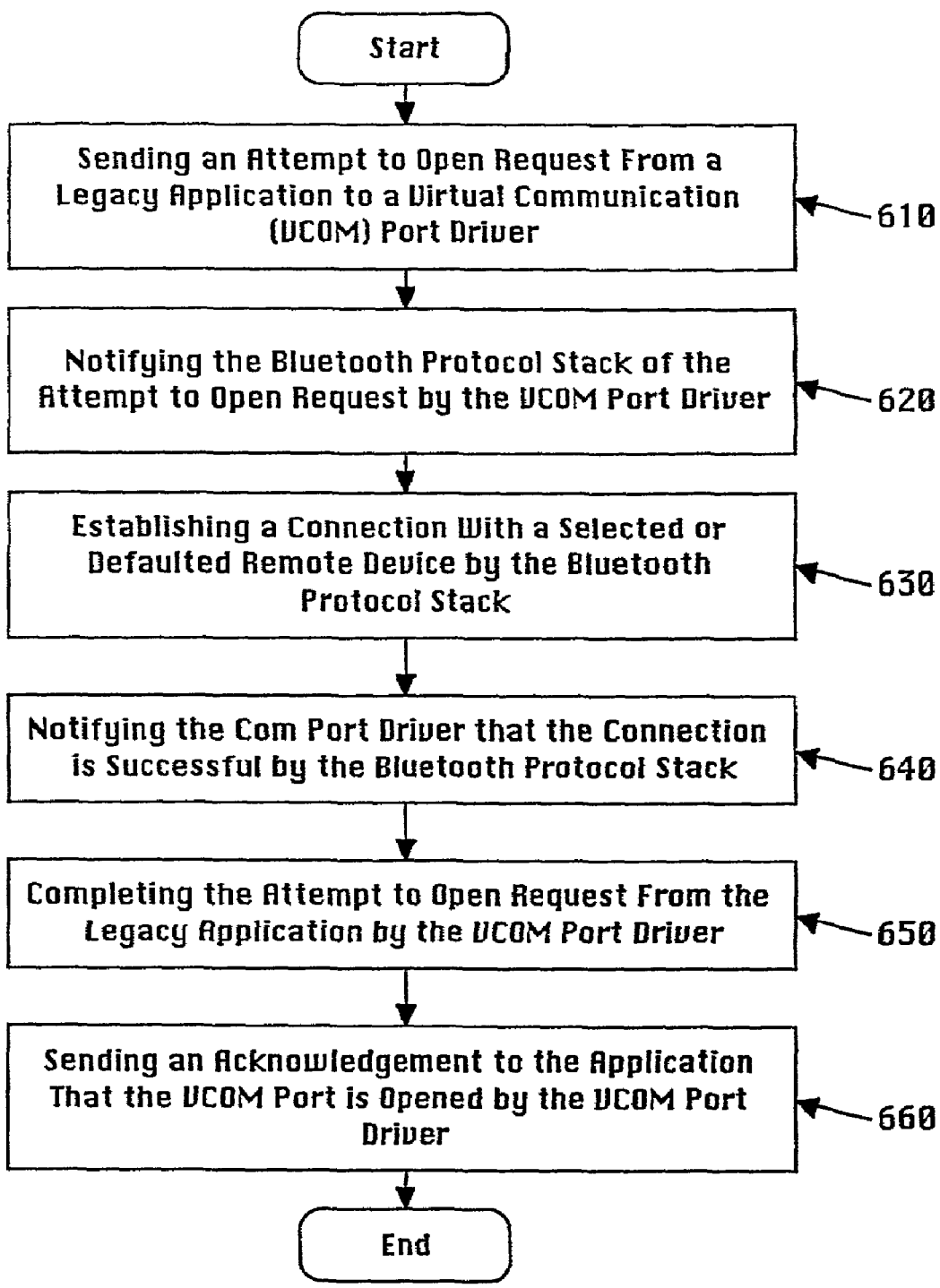
FIG. 6 is a flow diagram illustrating steps in a computer implemented method for opening a virtual serial communications port by a legacy application, in accordance with one embodiment of the present invention.

FIG. 6 is a flow chart diagram 600 illustrating steps in a computer implemented method for opening a VCOM serial port for a legacy application, in accordance with one embodiment of the invention. The fundamental principle behind the present embodiment is that a driver of a VCOM port in a wireless communication network does not successfully complete a port-open-attempt until a wireless connection (e.g., a Bluetooth connection) is established. This ensures that the legacy application will be able to communicate with a remote electronic device over a wireless communication network.

The present embodiment, in step 610 of flow chart 600, begins by sending an attempt-to-open call from a legacy application to a VCOM port driver. The VCOM port driver does not immediately complete the attempt-to-open call.

Instead, the present embodiment has the VCOM port driver notifying the protocol stack (e.g., the Bluetooth protocol stack) of the attempt-to-open call, in step 620. This effectively suspends the attempt-to-open operation as the legacy application is waiting for a return status on the call: such as, successful, or unsuccessful, or error.

In step 630, the present embodiment establishes a communication path or connection between the local electronic device and the remote electronic device over the wireless communication network. The remote device can be selected by prompting the user to select, as is described in FIG. 7, or can be pre-configured, as described in the description associated with FIG. 5.

The Bluetooth protocol stack provides for establishing a communication path between the two devices. Since the communication path is established, as soon as the legacy application begins transmitting data to the VCOM port, the data is sent out to the remote electronic device without any failures in communication.

In step 640 of flow chart 600, the present embodiment has the Bluetooth protocol stack notifying the VCOM port driver that the connection was successful and that a communication path is established between the local electronic device and the remote electronic device.

Thereafter, the present embodiment opens the VCOM port by having the VCOM port driver complete the attempt-to-open call. In step 660 of flow chart 600, the present embodiment allows for immediate data communication over the VCOM port from the legacy application by sending an acknowledgment or message to the legacy application indicating that the attempt-to-open call was successful, and that the VCOM port is open for the legacy application to send "read" and "write" commands to a second application located at the remote device over the wireless communication network.

The Bluetooth protocol stack provides for devices to send serial data back and forth wirelessly. As described previously, one embodiment of the present invention implements a connection manager application that works within the Bluetooth protocol stack to create and manage virtual communication serial ports. This enables legacy applications to make a Bluetooth wireless connection in the same way a wired serial connection is established (e.g., opening a serial communication port, or a VCOM port). However, in the absence of a physical cable between the two devices, there needs to be a method to direct the data being sent out from the legacy application via the VCOM port to the desired remote Bluetooth enabled device. There may be several devices that support the serial functional profile that is serviced by the VCOM port and that are in proximity of the local electronic device initiating the connection.

Figure 7:
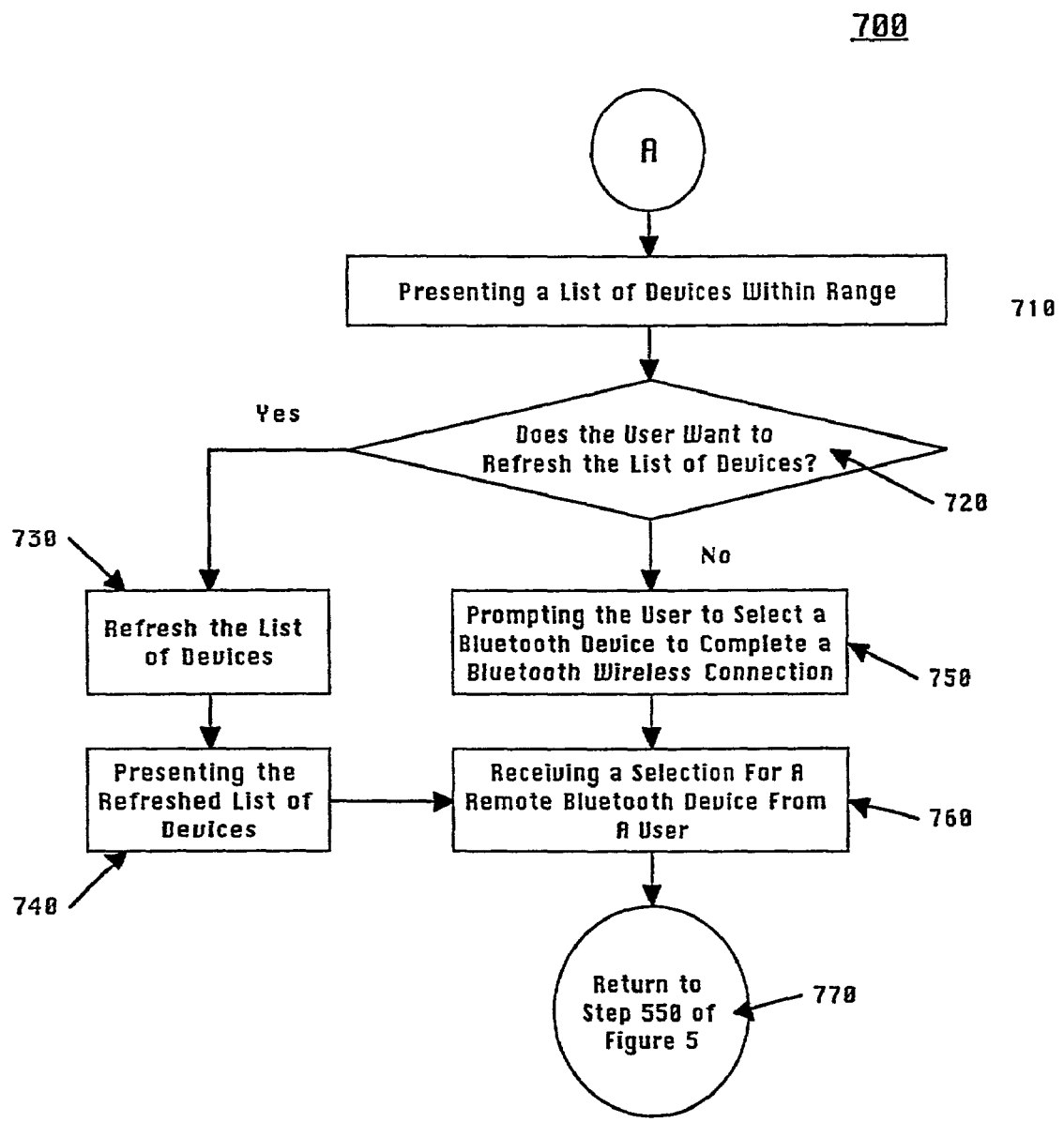
FIG. 7 is a flow diagram illustrating steps in a computer implemented method for presenting a list of available devices in a wireless local network when opening a virtual serial communications port, in accordance with one embodiment of the present invention.

FIG. 7 is a flow chart 700 illustrating steps in a computer implemented method for selecting between various remote devices in a wireless communication network when opening a VCOM port for serial communication, in accordance with one embodiment of the present invention. In step 710, the present embodiment flows from step A of FIG. 5 after an attempt-to-open call has been received by a driver of a VCOM port. In step 710, the present embodiment presents a list of all available devices that are within range of the local electronic device containing the legacy application. The list is not profile specific. In another embodiment, the devices contained within the list have the same functional profile as is serviced by the local VCOM port and that is supported by the legacy application.

In step 720 of the flow chart 700, the present embodiment decides whether a user of the local electronic device wants to refresh the list of available devices. In one embodiment, the present list of available devices comprises all the devices that were detected within range of its local network in the last inquiry or scan. Depending on the refresh rate, the intervening period could be tens of minutes in length.

If the user decides to refresh the list of available devices, the present embodiment proceeds to step 730, where a monitor application in the Bluetooth protocol stack sends out a new inquiry for available devices within its Bluetooth wireless network. The monitor application will automatically search for all devices within range.

In another embodiment, the monitor application may automatically search for all devices supporting the same functional profile as is serviced by the local VCOM port. For example, if the legacy application is a FAX application, then the monitor application may inquire as to all the devices with FAX capabilities.

In step 740, the connection manager application of the present embodiment will present a refreshed list to the user of the local electronic device of available devices that are within the local wireless network or piconet for communication. Thereafter, the present embodiment as shown in flow chart 700 proceeds to step 760 as will be described below.

If in step 720, the user decides not to refresh the list of available devices, the present embodiment proceeds to step 750 where the user is prompted to select a remote electronic device with wireless capabilities. The user chooses a remote device that is capable of supporting the functional profile that is serviced by the local VCOM port.

In step 760, the present embodiment recognizes receipt of a selection for a remote electronic device that is wirelessly enabled (e.g., a Bluetooth wireless device) from a user of the local electronic device. Thereafter, the present embodiment returns to step 550 of FIG. 5 in step 770.

Figure 8:
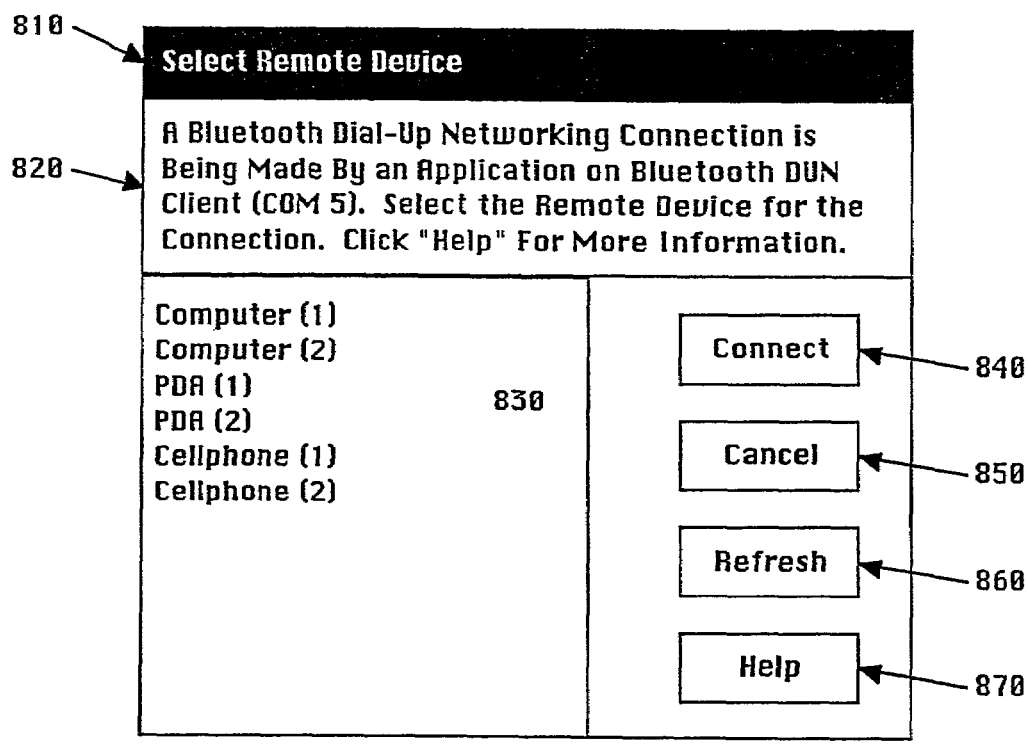
FIG. 8 is a block diagram showing an exemplary display screen illustrating a select remote dialog that lists the available devices in a wireless local network when opening a virtual serial communications port, in accordance with one embodiment of the present invention.

FIG. 8 is a block diagram illustrating a dialog 800 for selecting a remote electronic device for establishing a communication path, in accordance with one embodiment of the present invention. The dialog 800 is presented to the user when opening a VCOM port, as is described in step 710 of flow chart 700.

The user of a legacy software application is prompted at the time the application opens the COM port (e.g., VCOM port 5). This allows the user to select a remote Bluetooth device while in the context of making the connection. The user does not need to do any special configuration of the Bluetooth VCOM port 5 before using the legacy application to open the port. The Bluetooth specific details are hidden from the user. As such, the user of the legacy application can use the Bluetooth VCOM port in the same way any other serial communications port would be used. The only exception is that when the port is opened, the user is prompted to select a remote Bluetooth device. Afterwards, the connection proceeds as it would with a wired serial connection.

FIG. 8 shows the title 810 indicating the select remote device dialog 800. In addition, FIG. 8 shows an information bar 820 defining the VCOM port to which the communication path is established for. For example, in information bar 820, the present embodiment is making a DUN connection for a legacy application on communications port five (VCOM 5). The user is prompted to select from a list 830 of available devices that were discovered during the last inquiry by the monitor application. Also, for help, the user can engage the help button 870.

The list 830 shows that 6 devices were found in the last scan or inquiry. The list may contain one or more devices that are capable of supporting the functional profile (DUN) serviced by the communications port five. The list includes the following: computer-1, computer-2, personal digital assistant (PDA)-1, PDA-2, cellphone-1, and cellphone-2.

Since new devices not listed above may have roamed into the piconet associated with the local electronic device containing VCOM 5, or the devices listed above in list 830 could have been de-listed from the piconet, either by shutting down or by roaming out of the local network, the list 830 may not be current. As such a refresh button 860 is displayed. The user may select refresh button 860 for the protocol stack (e.g., Bluetooth protocol stack) to conduct a new inquiry, as is described in the discussion relating to FIG. 7.

In addition, dialog 800 shows a connect button 840. After a remote device is highlighted or selected in list 830, the user may elect to establish a wireless connection (e.g., a Bluetooth wireless connection) between the local electronic device and the selected remote device. This is accomplished by engaging connect button 840.

Should the user elect to cancel the selection of a remote device, the cancel button 850 is engaged. In one embodiment, the cancel function will cancel the dialog 800. In another embodiment, the cancel function will abort the opening of the VCOM port entirely.

When a legacy application opens a Bluetooth virtual COM port, the Bluetooth protocol stack needs information about the device to which the connection is being made, and the specific Bluetooth profile through which the data should be exchanged. This information is necessary in order to connect to the remote Bluetooth device and to obtain an RFCOMM communications channel through which the data passes.

One embodiment of the present invention describes a method through which VCOM ports can be pre-designated or pre-configured to a specific Bluetooth profile and pre-configured to a specific remote device. For example, using this model, there are multiple Bluetooth profiles which can be implemented for legacy applications by using the VCOM ports. Some of these profiles include DUN, FAX, and LAN access profiles.

Once the configuration is established, a user can select the pre-configured COM port in the same way any other COM port would be initialized or assigned. The VCOM port can be used to send and receive data without having to interact with the Bluetooth specific user interface. Thus, the user can use the Bluetooth VCOM port in the same way any other COM port would be used. When the port is opened, the connection proceeds as it would with a wired serial connection.

Figure 9:
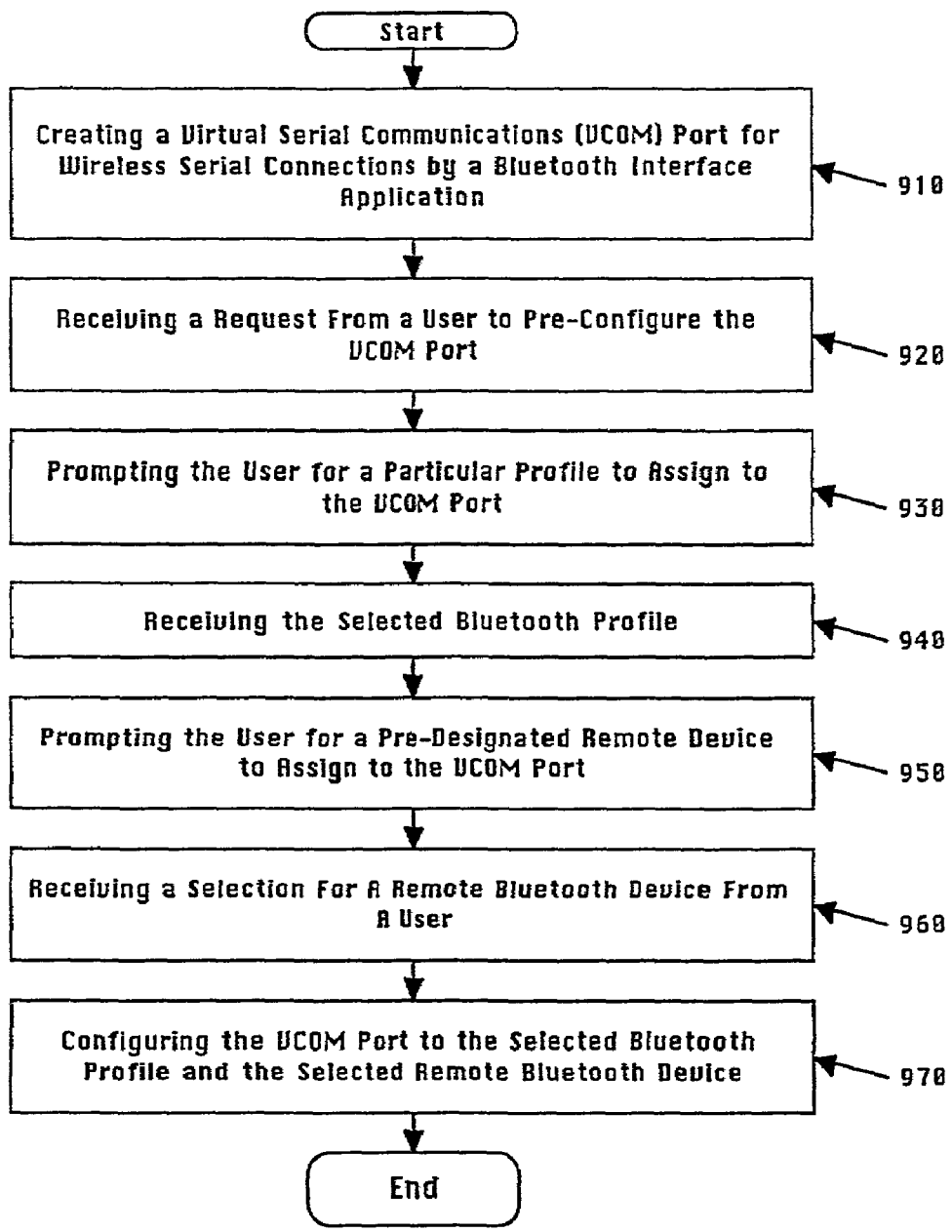
FIG. 9 is a flow diagram illustrating steps in a computer implemented method for pre-configuring a virtual serial communications port, in accordance with one embodiment of the present invention.

FIG. 9 is a flow chart 900 illustrating steps in a computer implemented method for pre-configuring a VCOM port in a local electronic device with wireless capabilities (e.g., a Bluetooth wireless enabled device), in accordance with one embodiment of the present invention. In step 910, the present embodiment creates a VCOM port for serial communication over a wireless communication network (e.g., Bluetooth network). In one embodiment, the connection manager application creates and manages the VCOM serial port in the local electronic device.

In step 920, the present embodiment receives a request from a user to pre-configure the VCOM port. The request may come from an editing display (not shown) created and managed by the connection manager application. The editing display allows a user to view and edit all the virtual communications ports in the local electronic device.

In step 930, the present embodiment prompts the user to select a particular functional profile to be assigned to the VCOM port. These functional profiles are supported by the wireless communications protocol stack (e.g., Bluetooth protocol stack) and include the DUN profile, FAX profile, etc. In step 940, the present embodiment receives the Bluetooth profile as selected by the user.

In step 950, the present embodiment prompts the user to define a pre-designated remote device that is assigned to the VCOM port. When opened, the VCOM port will not prompt a user to select between various available electronic devices in a list (e.g., list 830), but will directly establish a connection or communication path with the pre-designated remote device. In step 960, the present embodiment receives the defined remote Bluetooth device.

In step 970, the present embodiment configures the VCOM port to the selected Bluetooth profile. In addition, the present embodiment configures the VCOM port with the defined and pre-designated remote device.

The method as described in flow chart 900 allows a user to avoid the prompting for a selection from a list of available devices. In addition, the method as described in flow chart 900 also allows a VCOM port to be altered and to take on new functional profile. For example, a user may not have need for a FAX profile on the local electronic device. However, the user may need multiple ports for a DUN connections. In this case, the FAX port can be changed to a DUN port giving a user two VCOM ports for DUN communication channels.

The methods as described in flow charts 500, 600, 700, and 900 improve the end-user interface in establishing a Bluetooth wireless connection. Through the use of a VCOM port and the connection manager application, the user interface mimics the connections made by a legacy application to a serial communication port that is hardware based. The only difference is that the end-user need only take action in cases where the connection cannot be made, or where the connection manager application cannot determine to which remote device the legacy application is directed. The end-user does not have to setup a wireless connection prior to running an application that uses the VCOM port supported by the protocol associated with the wireless communication network, nor does the user need to interface with a wireless communication specific interface (e.g., Bluetooth specific interface). The user runs the application and the wireless communication connection manager application (e.g., Bluetooth connection manager) establishes a connection with the selected remote device behind the scenes with minimal prompting from the user.

While the methods of embodiments illustrated in processes 500, 600, 700 and 900 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

The instructions for the steps, and the data input and output from the steps of processes 500, 600, 700, and 900 may be implemented utilizing processor 350 and ROM memory 330 and RAM memory 310, as shown in FIG. 3. Furthermore, other types aforementioned such as a hard drive, a CD ROM, flash memory, or any compact integrated circuit memory storage device.

Hence, the present invention provides a method and apparatus for opening a virtual serial communications port by a legacy application for communication over a wireless communication network. Also, the present invention provides an apparatus and method that achieves the above accomplishment and which also provides for legacy application communication over a wireless communication network containing numerous remote devices. Moreover, the present invention achieves the above accomplishments and also provides for legacy application integration with a wireless communication network for establishing a connection to a particular remote device.

A method and apparatus for the opening of a virtual serial communications port for communication over a wireless communication network, is thus described. While the present invention has been described in particular embodiments, it should be appreciated that the present invention should not be construed as limited by such embodiments, but rather construed according to the below claims.

What is claimed is:

1. A method for opening a communications port for communication over a wireless communication network, said method comprising the steps of:
    configuring a VCOM port with a first functional profile from a plurality of functional profiles that are supported by said protocol stack, said first application and said remote electronic device supporting said first functional profile, said functional profile comprising:
        a dial-up networking (DUN) profile;
        a facsimile profile;
        a generic client serial port profile;
        a generic host serial port profile; and
        a local area network (LAN) access profile;
    a) receiving a call from a first application at a driver of said virtual communication (VCOM) port to open said VCOM port, said VCOM port located on a first electronic device;
    b) notifying a protocol stack of said call, by said driver, said protocol stack associated with said wireless communication network;
    c) establishing a communication path between said VCOM port and a remote electronic device, by said protocol stack;
    d) notifying said driver that said communication path has been established, by said protocol stack;
    e) opening said VCOM port, by said driver; and
    f) sending a message to said first application, by said driver, indicating said VCOM port is open allowing for data transfer between said first application and said remote electronic device over said wireless communication network.

2. The method as described in claim 1, wherein step b) further comprises:
    notifying a Bluetooth wireless communication protocol stack of said call by said driver, said protocol stack being said Bluetooth wireless communication protocol stack that substantially complies with a version of a Bluetooth wireless communication standard.

3. The method as described in claim 1, wherein said step f) further comprises:
sending a message to said first application indicating said VCOM port is open allowing for data transfer between said first application and a second communications port located at said remote electronic device, said second communications port configured to support said first functional profile.

4. The method as described in claim 1, wherein said method comprises further steps performed after step b) and before step c) of:
j) presenting a list of available devices to a user of said first electronic device, said list of available devices including all electronic devices within said wireless communication network that are capable of communicating with said first electronic device, each of said list of available devices capable of supporting said first functional profile; and
jj) receiving a first selection of said remote electronic device from said list of available devices from said user.

5. The method as described in claim 4, further comprising the steps of:
k) presenting an option to said user for conducting an inquiry in order to locate a group of currently available devices within said wireless communication network that are capable of communicating with said first electronic device, said group of currently available devices supporting said first functional profile;
kk) receiving a second selection of said option; and
kkk) conducting said inquiry to locate said group of currently available devices, said list of available devices including said group of currently available devices.

6. The method as described in claim 1, wherein said remote electronic device is pre-configured for said VCOM port.

7. The method as described in claim 1, comprising the further steps before step a)
i) assigning said VCOM port with said first application for the transfer of data to and from said first application.

8. The method as described in claim 1, wherein said VCOM port is a virtual serial communications port.

9. The method as described in claim 1, wherein said step a) further comprises:
receiving said call from a legacy application, wherein said first application is said legacy application that as written is not compatible with either said protocol stack or said wireless communication network.

10. The method as described in claim 1; wherein said method before step a) further comprises the steps of:
receiving a first designation, by a user of said first electronic device, configuring a first functional profile to said VCOM port, said first functional profile supported by said protocol stack; and
receiving a second designation, by said user, configuring said remote electronic device with said VCOM port, said VCOM port used for the transfer of data between said first application and a second application located on said remote electronic device, said second application capable of supporting said first functional profile.

11. The method as described in claim 10, wherein said method before step a) comprises the further steps of:
loading said first application on said first electronic device; and
assigning said first VCOM port to said first application for the transfer of data to and from said first application, said first application capable of supporting said first functional profile.

12. A method for establishing a communication path over a wireless communication network, said method comprising the steps of:
a1) receiving a call from a first application to open a first virtual communication (VCOM) port, said first VCOM port located on a first electronic device that is coupled to said wireless communication network;
a2) presenting a first option to said user for conducting an inquiry in order to locate a group of currently available devices within said wireless communication network that are capable of communicating with said first electronic device, said group of currently available devices supporting said first functional profile;
a3) receiving a second selection by said user for selecting said option;
a4) conducting said inquiry to locate said group of currently available devices, said list of available devices including said group of currently available devices;
b) presenting a list of available devices, said list of available devices including all electronic devices within said wireless communication network that are capable of communicating with said first electronic device, each of said list of available devices supporting a first functional profile from a plurality of functional profiles that are supported by a protocol stack associated with said wireless communication network;
c1) receiving a first selection of a remote electronic device from said list of available devices from a user of said first electronic device;
c2) creating said communication path between said remote electronic device and said first electronic device; and
d) opening said first VCOM port for data transfer between said first application and said remote electronic device over said wireless communication network.

13. The method as described in claim 12, further comprising the step of:
presenting a second option to cancel said opening of said first VCOM port as described in step d).

14. The method as described in claim 12, comprising before step a1) the further step of:
receiving a second selection for selecting said first VCOM port from a plurality of VCOM ports on said first electronic device for the transfer of data to and from said first application.

15. The method as described in claim 12, wherein said protocol stack and said wireless communication network substantially comply with a version of a Bluetooth wireless communication standard.

16. A computer system comprising:
a bus;
a processor coupled to said bus,
a memory unit coupled to said bus, wherein said memory unit contains instructions that when executed implement a method for opening a communications port for communication over a wireless communication network, said method comprising the steps of:
a1) configuring a VCOM port with a first functional profile from a plurality of functional profiles that are supported by said protocol stack, said first application and said remote electronic device supporting said first functional profile, said functional profile comprising:
a dial-up networking (DUN) profile;

a facsimile profile;
a generic client serial port profile;
a generic host serial port profile; and
a local area network (LAN) access profile;
a2) receiving a call from a first application at a driver of a virtual communication (VCOM) port to open said VCOM port, said VCOM port located on a first electronic device;
b) notifying a protocol stack of said call, by said driver, said protocol stack associated with said wireless communication network;
c) establishing a communication path between said VCOM port and a remote electronic device, by said protocol stack;
d) notifying said driver that said communication path has been established, by said protocol stack;
e) opening said VCOM port, by said driver; and
f) sending a message to said first application, by said driver, indicating said VCOM port is open allowing for data transfer between said first application and said remote electronic device over said wireless communication network.

17. The computer system as described in claim 16, wherein said step f) in said method for opening a communications port further comprises:
sending a message to said first application indicating said VCOM port is open allowing for data transfer between said first application and a second communications port located at said remote electronic device, said second communications port configured to support said first functional profile.

18. The computer system as described in claim 16, wherein said method for opening a communications port comprises further steps performed after step b) and before step c) of:
j) presenting a list of available devices to a user of said first electronic device, said list of available devices including all electronic devices within said wireless communication network that are capable of communicating with said first electronic device, each of said list of available devices capable of supporting said first functional profile; and
jj) receiving a first selection of said remote electronic device from said list of available devices from said user.

19. The computer system as described in claim 18, wherein said method for opening a communications port further comprises the steps of:
k) presenting an option to said user for conducting an inquiry in order to locate a group of currently available devices within said wireless communication network that are capable of communicating with said first electronic device, said group of currently available devices supporting said first functional profile;
kk) receiving a second selection of said option; and
kkk) conducting said inquiry to locate said group of currently available devices, said list of available devices including said group of currently available devices.

20. The computer system as described in claim 16, wherein said remote electronic device is pre-configured for said VCOM port.

21. The computer system as described in claim 16, wherein said method for opening a communications port comprises the further steps before step a1)
i) assigning said VCOM port with said first application for the transfer of data to and from said first application.

22. The computer system as described in claim 16, wherein said VCOM port is a virtual serial communications port.

23. The computer system as described in claim 16, wherein said step a2) in said method for opening a communications port further comprises:
receiving said call from a legacy application, wherein said first application is said legacy application that as written is not compatible with either said protocol stack or said wireless communication network.

24. The computer system as described in claim 16, wherein said method for opening a communications port further comprises the steps of:
i) receiving a first designation, by a user of said first electronic device, configuring a first functional profile to said VCOM port, said first functional profile supported by said protocol stack; and
ii) receiving a second designation, by said user, configuring said remote electronic device with said VCOM port, said VCOM port used for the transfer of data between said first application and a second application located on said remote electronic device, said second application capable of supporting said first functional profile.

25. The computer system as described in claim 24, wherein said method for opening a communications port comprises the further steps of:
iii) loading said first application on said first electronic device; and
iv) assigning said first VCOM port to said first application for the transfer of data to and from said first application, said first application capable of supporting said first functional profile.

* * * * *